United States Patent
Rope et al.

(10) Patent No.: US 10,644,803 B2
(45) Date of Patent: *May 5, 2020

(54) HISTOGRAM BASED OPTIMIZATION FOR OPTICAL MODULATION

(71) Applicant: INPHI CORPORATION, Santa Clara, CA (US)

(72) Inventors: Todd Rope, Santa Clara, CA (US); Hari Shankar, Santa Clara, CA (US); Radhakrishnan L. Nagarajan, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/582,985

(22) Filed: Sep. 25, 2019

(65) Prior Publication Data
US 2020/0021364 A1     Jan. 16, 2020

Related U.S. Application Data

(63) Continuation of application No. 15/644,342, filed on Jul. 7, 2017, now Pat. No. 10,469,176.

(51) Int. Cl.
| | |
|---|---|
| *H04B 10/079* | (2013.01) |
| *H04B 10/516* | (2013.01) |
| *H04B 10/50* | (2013.01) |
| *H04B 10/40* | (2013.01) |
| *H04B 10/572* | (2013.01) |
| *H04L 1/00* | (2006.01) |

(52) U.S. Cl.
CPC ..... *H04B 10/5161* (2013.01); *H04B 10/07953* (2013.01); *H04B 10/40* (2013.01); *H04B 10/5057* (2013.01); *H04B 10/572* (2013.01); *H04L 1/004* (2013.01); *H04B 10/0795* (2013.01)

(58) Field of Classification Search
None
See application file for complete search history.

(56) References Cited

U.S. PATENT DOCUMENTS

| | | | | |
|---|---|---|---|---|
| 6,577,421 | B1 * | 6/2003 | Cheng | H04B 10/1125 398/129 |
| 6,731,697 | B1 * | 5/2004 | Boccuzzi | H04L 7/0334 375/326 |
| 7,116,454 | B2 * | 10/2006 | Elbers | H04B 10/07953 398/25 |
| 7,200,328 | B2 * | 4/2007 | Shake | H04B 10/07951 398/10 |

(Continued)

*Primary Examiner* — Jai M Lee
(74) *Attorney, Agent, or Firm* — Richard T. Ogawa; Ogawa P.C.

(57) ABSTRACT

The present invention is directed to communication systems and methods. In a specific embodiment, the present invention provides an optical receiver that receives a data stream from an optical transmitter. The optical receiver determines a histogram contour parameter using the data stream and inserts the histogram contour parameter into a back-channel data segment, which is then transmitted to the optical transmitter. The optical transmitter changes its data transmission setting based on the histogram contour parameter. There are other embodiments as well.

16 Claims, 10 Drawing Sheets

(56) References Cited

U.S. PATENT DOCUMENTS

| | | | | |
|---|---|---|---|---|
| 8,681,027 | B2* | 3/2014 | Abe | H04B 10/60 341/118 |
| 9,780,881 | B1* | 10/2017 | Rope | H04B 10/0795 |
| 10,469,176 | B2* | 11/2019 | Rope | H04B 10/5057 |
| 2002/0171885 | A1* | 11/2002 | Rasztovits-Wiech | H04B 10/07953 398/27 |
| 2003/0115028 | A1* | 6/2003 | Summerfield | H04B 10/07 703/6 |
| 2004/0250179 | A1* | 12/2004 | Laquai | H04L 1/205 714/699 |
| 2009/0170458 | A1* | 7/2009 | Molisch | H04B 1/71637 455/226.1 |
| 2014/0308034 | A1* | 10/2014 | Chung | H04B 10/07953 398/26 |

\* cited by examiner

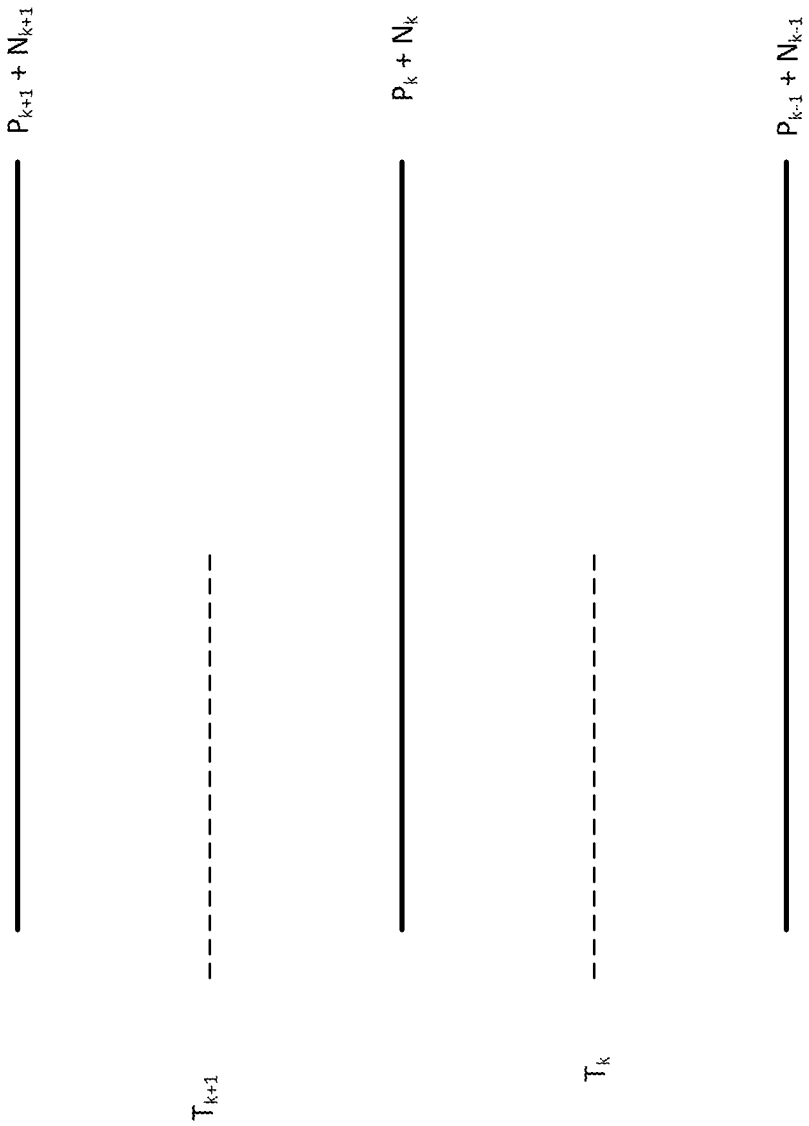

HISTOGRAM BASED OPTIMIZATION FOR OPTICAL MODULATION

CROSS-REFERENCES TO RELATED APPLICATIONS

This application is a continuation of and claims priority to U.S. application Ser. No. 15/644,342, filed on Jul. 7, 2017, which is incorporated herein by reference in its entirety.

STATEMENT AS TO RIGHTS TO INVENTIONS MADE UNDER FEDERALLY SPONSORED RESEARCH AND DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to communication systems and methods.

Over the last few decades, the use of communication networks exploded. In the early days of the Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. To move a large amount of data, optical communication networks are often used.

With high demand for communication networks came high demand for quality networking devices. In high-speed communication systems, having optimized optical transceivers can meaningfully improve performance. For example, various parameters of optical transmitter, such as bias voltages for modulator and laser devices, can be adjusted and optimized in a communication system for improved performance.

Over the past, there have been various techniques for optimizing parameters and settings for optical transceivers. Unfortunately, existing techniques are inadequate for reasons explained below. Improved methods and systems for optimizing optical communication devices are desired.

BRIEF SUMMARY OF THE INVENTION

The present invention is directed to communication systems and methods. In a specific embodiment, the present invention provides an optical receiver that receives a data stream from an optical transmitter. The optical receiver determines a histogram contour parameter using the data stream and inserts the histogram contour parameter into a back-channel data segment, which is then transmitted to the optical transmitter. The optical transmitter changes its data transmission settings based on the histogram contour parameter. There are other embodiments as well.

According to an embodiment, the present invention provides an optical transceiver apparatus. The apparatus includes an optical receiver for converting incoming optical signals to incoming electrical signals. The apparatus also includes a digital signal processor (DSP) configured to analyze the incoming electrical signals and to generate a histogram characterizing the incoming electrical signals. The apparatus further includes a forward-error correction (FEC) module configured encode the incoming electrical signal. The apparatus also includes a control module, which processes the incoming electrical signal and to generate a signal quality value based on the histogram. The signal quality value is calculated using a quadratic fit of the histogram. The control module is further configured to generate back-channel data based at least on the signal quality value. The control module further is configured to insert the back-channel data to an outgoing data stream. The apparatus has an optical transmitter for generating output optical signals based on the outgoing data stream.

According to another embodiment, the present invention provides an communication system. The system includes a communication link. The system includes a first transceiver comprising a first control module and a first transmitter. The system further includes a second transceiver comprising a second control and a second transmitter. The second transceiver is configured to send data to the first transceiver. The first transceiver is configured to process a first data stream received from the second transceiver and to detect a first back channel data. If the first transceiver detects the first back channel data, the first transceiver is configured to determine a histogram contour parameter associated with the first data stream and insert the histogram contour parameter into a second back channel data. The second back channel data is embedded in a second data stream. The second transceiver is configured to process the second data stream received from the first transceiver. The second transceiver is configured to detect the second back channel data and adjusts one or more operating parameters based on the histogram contour parameter.

According to yet another embodiment, the present invention provides a method for optimizing optical communication. The method includes transmitting a first data stream from a first optical transceiver to a second optical transceiver via an optical communication link. The method also includes detecting a first back-channel data segment at the first data stream by the second optical transceiver. The method further includes determining a histogram contour parameter associated with the first data stream by the second optical transceiver. The method also includes generating a second back-channel data by the second optical transceiver. The second back-channel data includes the histogram contour parameter. The method additionally includes inserting the second back-channel data to a second data stream by the second optical transceiver. The method also includes transmitting the second data stream from the second optical transceiver to the first optical transceiver. The method further includes detecting the second back-channel data by the first optical transceiver. The method also includes determining a first set of adjustments by the first optical transceiver based on the first set of measurements. The method includes applying the first set of adjustments to an optical transmitter by the first optical transceiver.

It is to be appreciated that embodiments of the present invention provide many advantages over conventional techniques. Among other things, by measuring actual signal characteristics (e.g., histogram) at a receiving optical transceiver of the data communication path, adjustments made by a transmitting optical transceiver improve data transmission quality better than existing techniques, where typically one-time factory settings are applied to optical transceivers.

Histograms and histogram contour parameters are efficient and effective when used in measuring signal quality. For example, adjustments such as wavelength control may be specific to the optical link and actual operating conditions (e.g., temperature, interference, etc.), which are information unavailable when optical transceivers were manufactured. It is therefore advantageous for the closed loop techniques provided by the present invention to use these information and hence improved performance.

Embodiments of the present invention can be implemented in conjunction with existing systems and processes. For example, the back-channel data can be implemented to be compatible with existing communication protocols. Back-channel data are used by optical transceivers that are preconfigured to use them, and optical transceivers that are not configured to use the back-channel data may simply ignore them. In addition, optical transceivers according to embodiments of the present invention can be manufactured using existing manufacturing equipment and techniques. In certain implementations, existing optical transceivers can be upgraded (e.g., through firmware update) to take advantage of the present invention. Histogram generation and calculations can be performed by configuring existing DSP devices. There are other benefits as well.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 10 is a simplified diagram illustrating signal strength relative to signal noise.

DETAILED DESCRIPTION OF THE INVENTION

Figure 1:
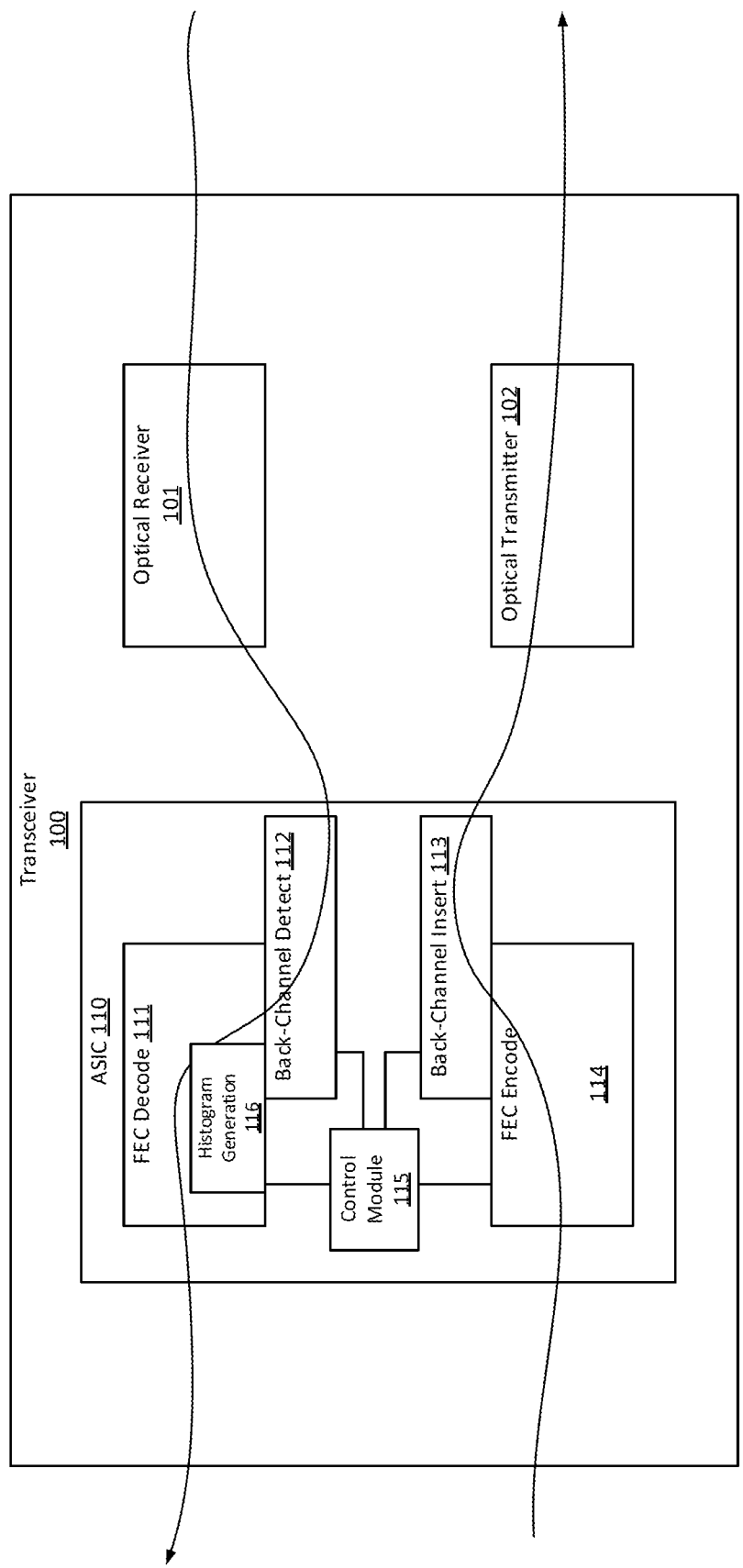
FIG. 1 is a simplified diagram illustrating optical transceiver according to an embodiment of the present invention.

The present invention is directed to communication systems and methods. In a specific embodiment, the present invention provides an optical receiver that receives a data stream from an optical transmitter. The optical receiver determines a histogram contour parameter using the data stream and inserts the histogram contour parameter into a back-channel data segment, which is then transmitted to the optical transmitter. The optical transmitter changes its data transmission setting based on the histogram contour parameter. There are other embodiments as well.

Most optical communication modules have some form of internal control systems to maintain the optical performance. For example, typical control parameters include optical power, wavelength, extinction ratio, and/or others. However, in most cases, conventional techniques for the transmitting optical module to maintain these parameters rely on proxy measurements. For example, transmitted optical power may be measured by a tap and photodiode, or extinction ratio may be inferred from a modulator bias. Unfortunately, these conventional techniques are inadequate. A difficulty is that these proxy measurements may not represent the actual transmission characteristics, and as a result the transmitting optical path is not optimized.

In optical communication, another difficulty is that in an optical line system (including fiber optics, amplifiers, multiplexers/de-multiplexers, dispersion compensation, etc.), optimal transmission parameters may not be constant and may in fact change due to the line equipment or conditions. This may render the transmission parameters even farther from optimal.

It is to be appreciated that embodiments of the present invention provide advantages over existing techniques. More specifically, embodiments of the present invention make use of digital signal processors (DSP) and forward error correction (FEC) modules on the optical receive path. The inclusion of a DSP and FEC on the optical receive path within the module itself allows the receiving side to determine the quality of the incoming optical signal. Additionally, embodiments of the present invention provide an advanced FEC encoding that includes the ability to place additional digital information alongside the transmitted data ("back-channel"), thereby allowing the receive-side module to inform the transmitting-side module of the current signal integrity. For example, the optical receiver generates histograms based on the received optical signals. Using the histograms, optical receiver generates control data (e.g., histogram contour parameter and/or quadratic fit coefficient) that is transmitted back to the optical transmitter. The optimal transmitter uses the control data to adjust and optimize data transmission parameters accordingly. More specifically, histogram information is used to determine to equalize and optimize the signal-to-noise ratio (SNR) of different PAM levels for the purpose of data transmission.

With DSP/FEC and advanced FEC encoding working together, a closed-loop system can be implemented, where the optical parameters of the transmit side can be tuned to optimally to reflect the current optical conditions. The tuning parameters include, but not limited to, compensating for aging or environmental effects of optical equipment from the transmitting optical module through to the receiving optical module.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram illustrating optical transceiver according to an embodiment of the present invention. This diagram is merely an example, which should not unduly limit the scope of the claims. One of ordinary skill in the art would recognize many variations, alternatives, and modifications. As shown in FIG. 1, transceiver 100 includes an optical receiver 101 that interfaces with an optical communication link and is configured to receive and process optical communication signals. In various embodiments, optical receiver includes various components, such as filter, transimpedance amplifier (TIA), fiber optic connectors, and others. Optical receiver 101 may additionally include optical transmission devices such as optical amplifiers, optical attenuators, chromatic dispersion compensation (static or tunable), lengths of fiber, patch panels and patch cables, optical multiplexers, optical de-multiplexers, etc. Among other features, optical receiver 101 converts received optical signals to electrical signals that can later be processed. The electrical signals are then processed by various digital signal processors (DSP). For example, application specific integrated circuit (ASIC) 110 includes FEC decoder 111 and a back-channel detector 112.

It is to be appreciated that once back-channel data are detected from the incoming data stream, it is determined that the source of the received optical signals is compatible with the use of back-channel data for adjusting its operating parameters. In various embodiments, the use of back-channel data is a part of a predetermined communication protocol that two or more transceivers use. If back-channel data is not detected from the received optical signals, the source of the received optical signals is not equipped to utilize back-channel data, and it would be unnecessary and even wasteful to perform signal measurements that are to be embedded into back channel data. According to various embodiments, the receiver section of transceiver 100 is capable of measuring a level histogram based on the received signal.

ASIC 110 may also include a module for measuring and analyzing signal integrity of the received signal (i.e., electrical signals converted from the received optical signals). Signal integrity may be evaluated in various signal measurements that include, but are not limited to overall signal-to-noise ratio (SNR), individual PAM-4 level SNR, overall PAM-4 histogram, optical eye diagram, and/or others. In additional to signal integrity, data error rate associated with the incoming signal may be evaluated as well. For example, FEC decoder 111 determines error rate before performing error recovery. More specifically, FEC decoder 111 has the ability to calculate a bit error ratio (BER) prior to FEC error recovery. Depending on the implementation, BER can be calculated in several different ways, such as overall BER, individual lane BER, individual PAM-4 level BER (i.e., MSB BER, LSB BER), bit-transition error matrix (e.g., in PAM-4, BER for 0->1, 0->2, 0->3 and all other level transitions), and/or other ways. In certain applications, BER is useful for optimization, but histograms can also be used. For example, when BER is relatively flat (e.g., see FIG. 5 and explanation below) over a large range of settings, it is difficult to rely on BER for setting adjustments.

The back-channel detection module 112 is configured to detect whether the received signals include back-channel data that can be used to optimize data transmission performance. For example, the back-channel data are embedded by the source of the received signals (e.g., another optical transceiver or communication apparatus). In various embodiments, the back-channel detection module 112 is coupled to a control module 115. The control module 115 is configured to adjust various operating and transmission parameters of transceiver 100 based on the back-channel data. For example, operating parameters include temperature, bias settings, multiplexer settings, wavelength, and others, which are described below. It is to be appreciated that the back-channel detection module 112 may be implemented as a part of the closed feedback loop (e.g., between two optical transceivers). That is, data are transmitted to a second transceiver over an optical communication link. The second transceiver includes DSP and FEC module that measure the signal quality (e.g., SNR) and data quality (e.g., BER), and the measurement results are embedded in the back-channel data that are transmitted back to transceiver 100. In various embodiments, signal quality and data quality are determined by using histograms. The back-channel detection module 112 detects the existence of the back-channel data, which are used by the control module 115 to adjust operating parameters of transceiver 100. Depending on the operating condition and specific implementation, there could be iterations of processes for changing parameters, receiving back-channel data reflecting the signal quality associated with the changed parameters, and changing parameters again. According to embodiments of the present invention, back-channel data include histogram data associated with transmitted signal, and the histogram data are used to determine optimal parameters for data transmission.

As shown in FIG. 1, ASIC 110 includes a histogram generation module 116. In various embodiments, histogram generation module 116 is implemented as a part of the ASIC 110 DSP. Histogram generation module 116 is configured to process the received signal and generate level histograms based on the received signals. In various embodiments, histogram generation module 116 executes mathematics on the histograms to generate histogram contour parameters (e.g., quadratic fit coefficients for certain applications) that can be used by the transmitter to optimize transmission parameters.

It is to be appreciated that, as explained below, back-channel data can be used to adjust not only transmitter parameters for outgoing data, but also receiver parameters for processing incoming data. For example, back channel data can be used to adjust how incoming optical signals are processed.

In various embodiments, control module 115 stores near-end parameters, which may be determined at the time when the transceiver 100 is manufactured. Control module 115 analyzes the received back-channel data, which reflects the actual conditions of data transmission, and the adjustment of operating parameters can be modifying the existing parameter based on the existing near-end parameters. In various embodiments, adjustment of operating parameters involves synchronizing and using both existing near-end data and the back-channel data that reflects conditions for actual data communication.

Transceiver 100 includes an FEC encoder 114 and a back-channel insertion module 113 as shown. For example, the FEC encoder 114 and the back-channel insertion module 113 are implemented as a part of the ASIC 110. It is to be understood that while FEC decoder 111 and FEC encoder 114 are shown as two functional blocks in FIG. 1, FEC decoder 111 and FEC encoder 114 may be implemented a single FEC module. Similarly, back-channel detection module 112 and the back-channel insertion module 113 can be implemented as single back-channel module.

FEC encoder 114 is configured to perform FEC encoding for electrical signals that are to be transmitted through the optical transmitter 102. For example, FEC encoder 114 is configured to perform different types of error correction. Back-channel insertion module 113 is configured to insert back-channel data into the outgoing data stream that is to be transmitted. As explained above, back-channel data include information regarding the quality of received data, which pertains to transmission parameters and settings of the transmitting transceiver that sends data to transceiver 100. It is to be appreciated that the back-channel insertion module is capable of inserting and/or detecting, with high fidelity, additional digital information alongside and without interfering with the transmitted data. For example, a predefined segment of outgoing data stream is used to embed the back-channel data. In various embodiments, back-channel insertion module 113 inserts histogram levels and/or histogram contours into back-channel data. As explained below, histogram contours can be calculated as polynomial coefficients of second order fit equations. At the far end, histogram contours are used in calibrating operating parameters (e.g., MZ bias point, heater power, etc.) that alters the modulation phase.

In FIG. 1, a close loop technique is used for optical communication, with an optical transmitter and an optical receiver. It is to be understood that close loop techniques that use back-channel for optimizing data communication can be used in other types of communication links as well, such as existing communication lines with copper wires and/or other mediums.

Figure 2:
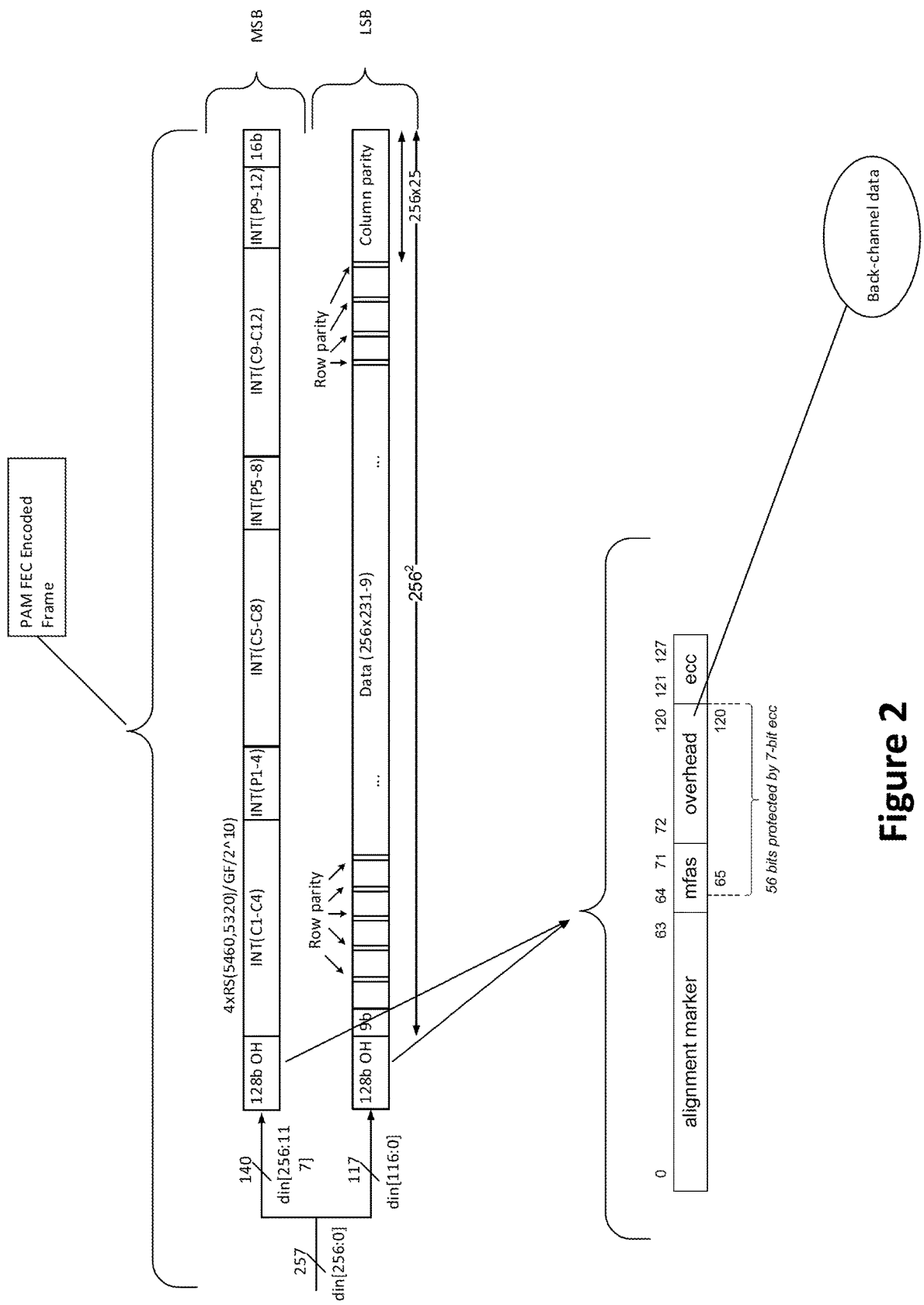
FIG. 2 is a simplified diagram illustrating an encoded data frame according to embodiments of the present invention.

FIG. 2 is a simplified diagram illustrating an encoded data frame according to embodiments of the present invention. This diagram is merely an example, which should not unduly limit the scope of the claims. One of ordinary skill in the art would recognize many variations, alternatives, and modifications. As shown in FIG. 2, an exemplary FEC encoded frame can be divided into a most significant bits (MSB) section and a least significant bits (LSB) section. Both the MSB section and the LSB section include their own respective headers. For example, the headers are 128 bits long. A header is then subdivided into alignment marker region (0-63 bits), "mfas" region (64-71 bits), overhead region (72-120 bits), and "ecc" region (121-127 bits). It is to be appreciated that overhead region stores back-channel data, which includes information related to quality (e.g., measured and/or calculated) of received signals. For example, an optical transceiver that is not equipped to take advantage of the back-channel data can simply ignore and skip over the back-channel region.

Histogram information based on the received signal can be large. But it is to be appreciated that, as explained below, histogram contour parameters (or quadratic fit coefficents) can be relatively small. By performing calculations, the DSP function of the ASIC 110 can effectively reduce histogram information to histogram contour parameters, which are small enough to be stored at the overhead region (e.g., 72-120 bits).

Now referring back to FIG. 1. Outgoing electrical signals are converted to optical signals and transmitted by the optical transmitter 102. For example, optical transmitter 102 includes one or more lasers devices (e.g., laser diode with cooling), one or more modulators. Additionally, optical transmitter 102 may include multiplexing and optical control blocks. Implementation and operating parameters of optical transmitter 102 usually have significant impact on signal quality and data transmission performance of the outgoing data stream. For example, one of the operating parameters is modulator heater power, which affects the modulator bias. For example, the DAC controlled heater receives control signal from the control module, which uses histogram contour as a basis for generating the control signal. It is to be noted that modulator bias can be changed in various ways, and an important aspect of using operating parameters is to change modulator bias and optimize data transmission. In certain embodiment, heater power is configured in a branch of a modulator, which affects modulator operation. There are other operating parameters associated with modulator bias. By adjusting operating parameters and settings of optical transmitter 102, signal quality and data transmission performance can be improved and optimized. While operating parameters and settings can be optimized initially at the factory, being able to adjust these parameters and settings based on actual signal measurements is better, since actual signal measurements reflect true operating conditions (e.g., fiber optic lines, interference, temperature, etc.).

According to various embodiments, the control module 115 of the transceiver 100 processes the received back-channel data, which include actual measurements of data quality as measured by a second transceiver that receives data from transceiver 100. The control module 115 then determines the optical parameters and settings accordingly. For example, operating parameters and settings may include, but not limited to, the following:

Modulator bias setting (e.g., heater power setting if a thermo-optically controlled MZM); and
Setting for DAC controller heater;
Laser temperature setting (or TEC current if directly controlled);
Laser bias current;

Multiplexer offset bias setting (e.g., heater power setting if a thermo-optically controlled DLI).

Figure 3:
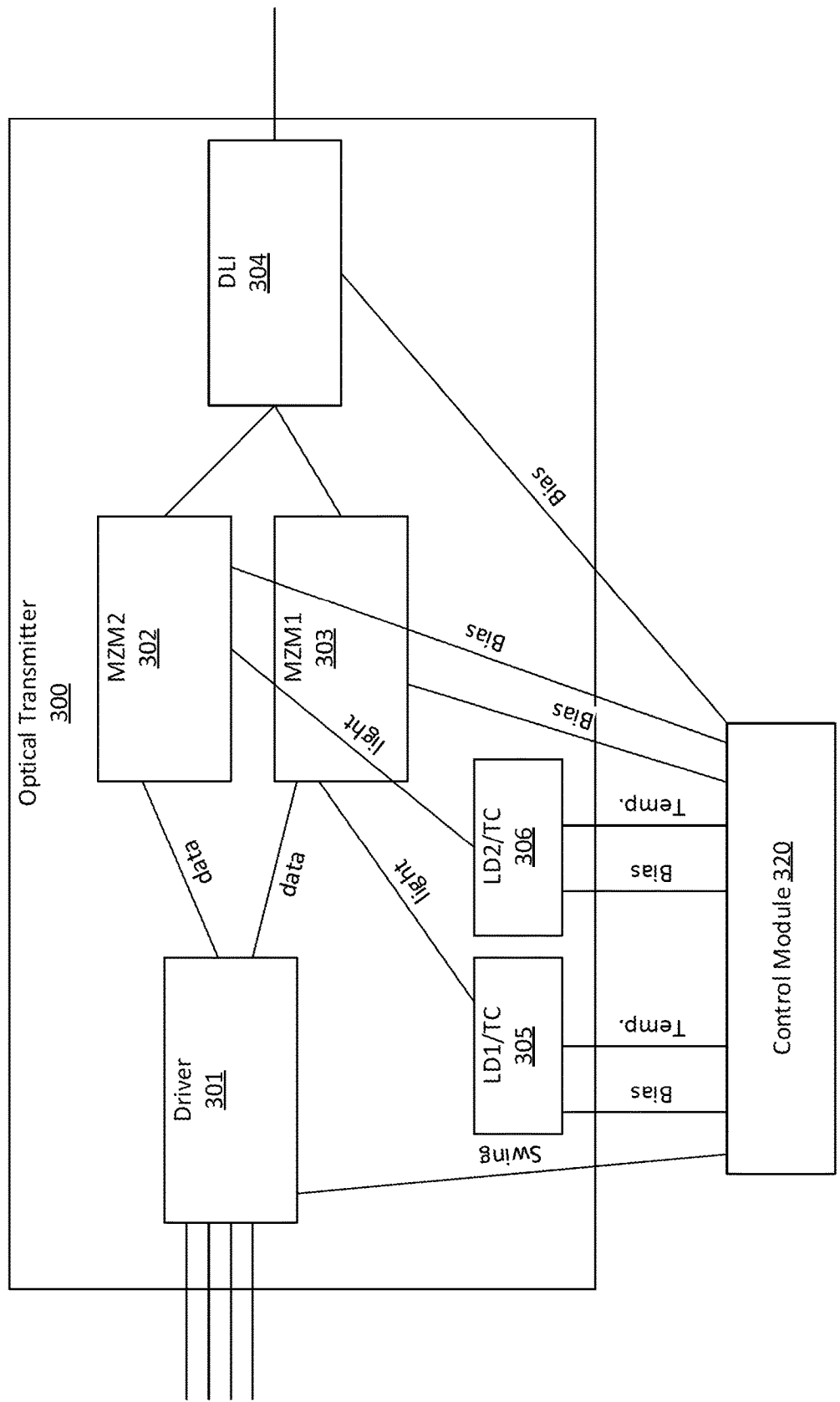
FIG. 3 is a simplified diagram illustrating an optical transmitter with back-channel data control according to embodiments of the present invention.

As an example, back-channel data provides signal quality information that can be used to adjust parameters of laser devices. More specifically, laser devices used for optical data transmission may be controlled using temperature and bias control parameters. FIG. 3 is a simplified diagram illustrating an optical transmitter with back-channel data control according to embodiments of the present invention. This diagram is merely an example, which should not unduly limit the scope of the claims. One of ordinary skill in the art would recognize many variations, alternatives, and modifications. As shown in FIG. 3, driver 301 that generates driver signal based on outgoing data can be adjusted by a voltage swing parameter. Similarly, modulators 302 and 303 may be adjusted using settings such as RF amplitude, DC bias, and/or others. For example, modulators 302 and 303 may be implemented using Mach-Zehnder modulators (MZM). Light source for optical transmitter 300 includes laser diodes 305 and 306. For example, laser diodes can be adjusted by changing laser bias and/or laser temperature. Similarly, delay line interferometer (DLI) 304, which functions as an optical multiplexer, can be adjusted with an offset bias and/or heater temperature. It is to be appreciated that the control module 320 of optical transmitter 300 can use the histogram contour parameter to determine which parameters (as listed above) are to be adjusted. For example, the control module 320 has a control interface that provides control signals for the abovementioned parameters such as bias control, temperature control, swing voltage, and others.

According to an embodiment, back-channel data are used as a part of optical receiver. As an example, optical receiver 101 is a part of the transceiver 100 as shown in FIG. 1, and various operating parameters of optical receiver 101 may be adjusted based on back channel data.

Figure 4:
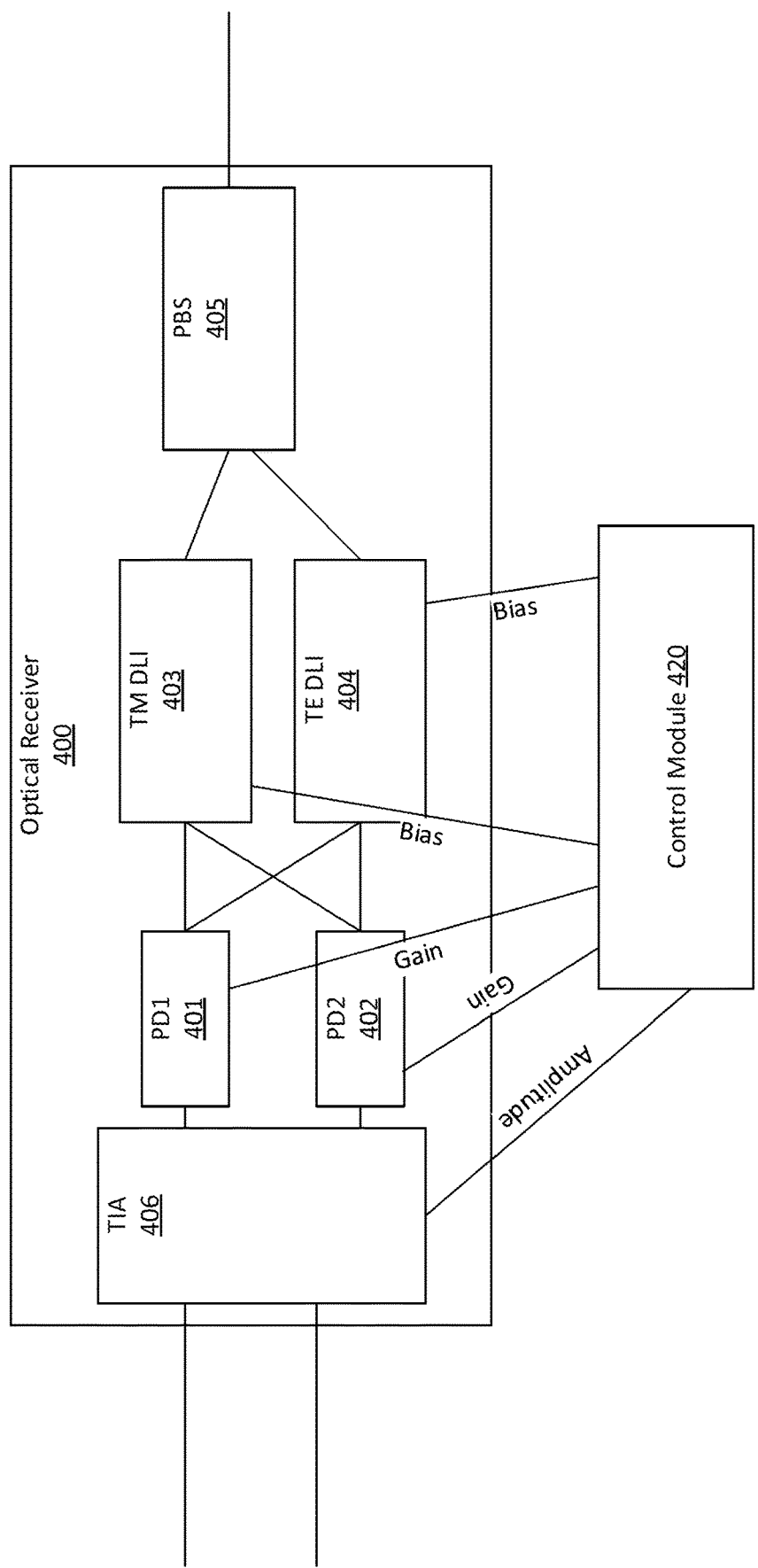
FIG. 4 is a simplified diagram illustrating an optical receiver 400 according to an embodiment of the present invention.

FIG. 4 is a simplified diagram illustrating an optical receiver 400 according to an embodiment of the present invention. This diagram is merely an example, which should not unduly limit the scope of the claims. One of ordinary skill in the art would recognize many variations, alternatives, and modifications. Optical receiver 400 includes polarization beam splitter (PBS) 405 that splits the received optical signal for processing. The received optical signal is then processed by optical multiplexers 403 and 404. For example, multiplexers 403 and 404 comprise DLI devices that can be adjusted using bias settings. For thermal-optically controlled DLIs, heater power settings may be used to adjust DLI operations. Multiplexers 403 and 404 are coupled to photodetectors 401 and 402, whose current gain settings can be adjusted. For example, photodetectors may be amplified, and thus gain settings are needed. For example, avalanche photodiodes can be adjusted by changing its photocurrent gain. The outputs of photodetectors 401 and 402 are coupled to TIA 406, which generates electrical signal based on the received optical signals. Depending on the implementation, various parameters such as amplitude, gain, and/or bandwidth, can be adjusted based on back-channel data. As mentioned above, a control module 420 may be used to process received back-channel data and generates control signals to adjust these parameters.

To make use of back-channel data, which include histogram related information, and to generate control signals for changing operating parameters, a control module can be used. For example, abovementioned control modules 420 may be implemented as a part of a computer engine block, or a microcomputer that is a part of optical transceiver ASIC. To use the transceiver 100 as an example, the control module is configured with the back-channel insertion module 113 to insert digital signals alongside the transmitted optical data. More specifically, histogram contour information is inserted into the back-channel data. Additionally, the control module is able to use the back-channel detector 112 to detect back-channel data embedded in the received signals. Once detected, the control module processes the back-channel data and generates control signals accordingly. As explained above, back-channel data include histogram contour data, and the control module uses the histogram contour data as parameters for generating control signals. The control signals are used to adjust various operating parameters of the transceiver (e.g., optical receiver, optical transmitter, etc.). For example, operating parameters include modulator bias and temperature, as described above. Additionally, operating conditions of the optical transceiver may change (e.g., interference, optical line quality, temperature change, etc.). By using back-channel data, the control module adjusts and optimizes transceiver performance accordingly. Since the back-channel data are shared between two or more transceivers, two transceivers form a feedback loop for optimizing data transmission over a communication link.

The back-channel data used between two data transmission entities provide a feedback mechanism for optimization data transmission parameters. More specifically, receiving entity generates back-channel data based on the quality of transmitted signal, and transmitting entity uses the back-channel data to adjust transmission parameters accordingly (multiple iterations may be needed). For the feedback mechanism to work, the back-channel data need to be available to the transmitting entity in a timely fashion, and the back-channel data must be meaningful indicator of signal quality.

Figure 5:
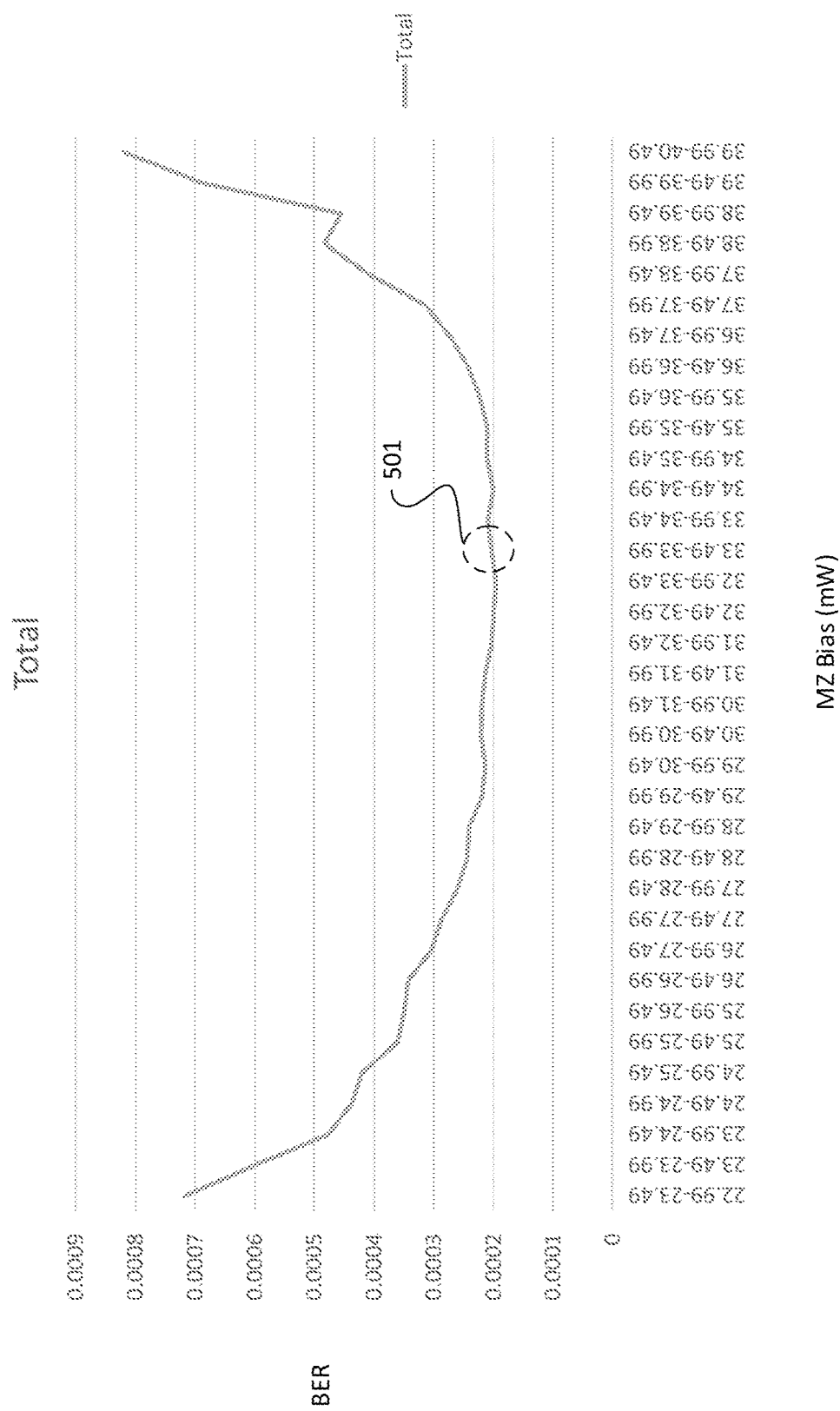
FIG. 5 is a simplified diagram illustrating relationship between BER and MZ bias.

According embodiments of the present invention, operating parameters for optical transmission are used for PAM transmission. In for example, off-quadrature biasing for MZ modulation can be used to maximize overall signal-to-noise ratio (SNR) of four levels in PAM4 communication. More specifically, higher levels naturally have lower SNR, it is typically desirable compress lower levels and expand higher levels to obtain equalized levels with optimized SNRs. In the past, finding the optimal point can be done at BOL by scanning the phase angle and measuring for the ideal bit-error ratio (BER), but over life the BER is a weak control for the optimal MZ bias point (heat power measured in mW), and is better used to control other parameters (e.g., wavelength, DLI heater power). FIG. 5 is a simplified diagram illustrating relationship between BER and MZ bias. As can be seen in FIG. 5, for a wide range of MZ bias power, the BER curve is substantially flat and valued between 0.0002 and 0.0003, and it is difficult to extrapolate the optimal MZ bias setting based on the BER information. It is thus to be appreciated that according to various embodiments, the present invention takes advantages of histogram to optimize data transmission. As an example, the optimal MZ bias setting (heater power measured in mW) is at about 35 mW, which corresponds to point 501 on the BER plot line.

As mentioned above, a receiving entity in an optical communication network is capable of generating and measuring a level histogram based on the received data. Additionally, the receiving entity executes mathematics on the level histogram to generate "histogram contour" parameters. The histogram contour is then embedded into back-channel data and transmitted back to the transmitting entity. The transmitting entity processes the histogram contour data from back channel and using the histogram contour data to adjust phase of MZ modulation (e.g., via a DAC controlled heater). The use of histogram is based on the observation that the peak of histogram at each PAM level is inversely related to noise of that level. For example, a higher PAM level can have larger amount of noise than a lower PAM level, and the SNRs of these two PAM levels can still be the same.

Figure 6:
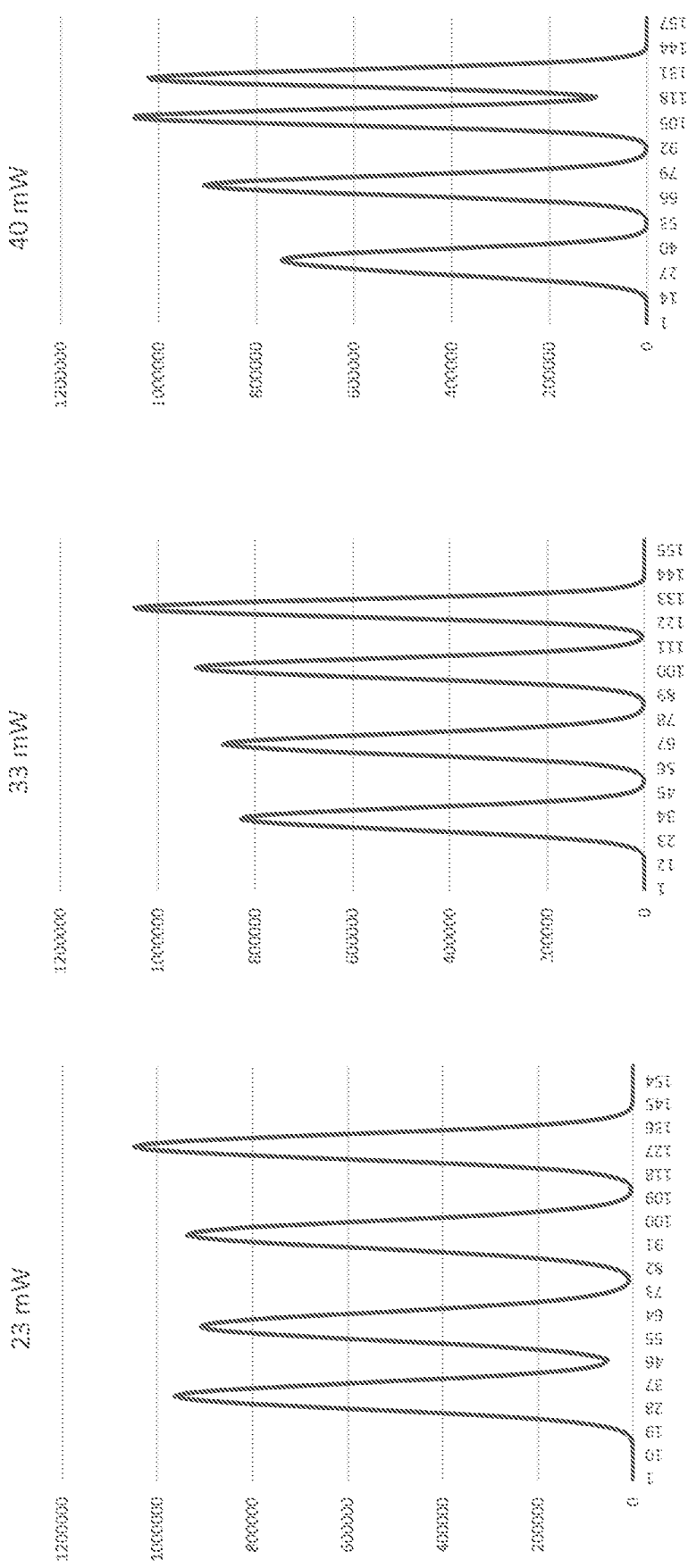
FIGS. 6A-6C provide histogram plots associated with received optical data signals. Each of the plots shows four peaks that correspond to four PAM levels.

The receiving entity (or near end entity) processes the received signal to generate the histograms. For example, histogram generation module 116 in FIG. 1 calculates histogram by plotting bin number (e.g., ADC count proportional to signal level) versus hit count. FIGS. 6A-6C provide histogram plots associated with received optical data signals. Each of the plots shows four peaks that correspond to four PAM levels. The X-axis is associated with modulation bias, and the Y-axis is BIN number readout (e.g., ADC readout count for the received optical signal). Plot 6A shows histogram associated with 23 mW of power applied to the modulation heater; Plot 6B shows histogram associated with 33 mW of power applied to the modulation heater; Plot 6C shows histogram associated with 40 mW of power applied to the modulation heater.

Figure 7:
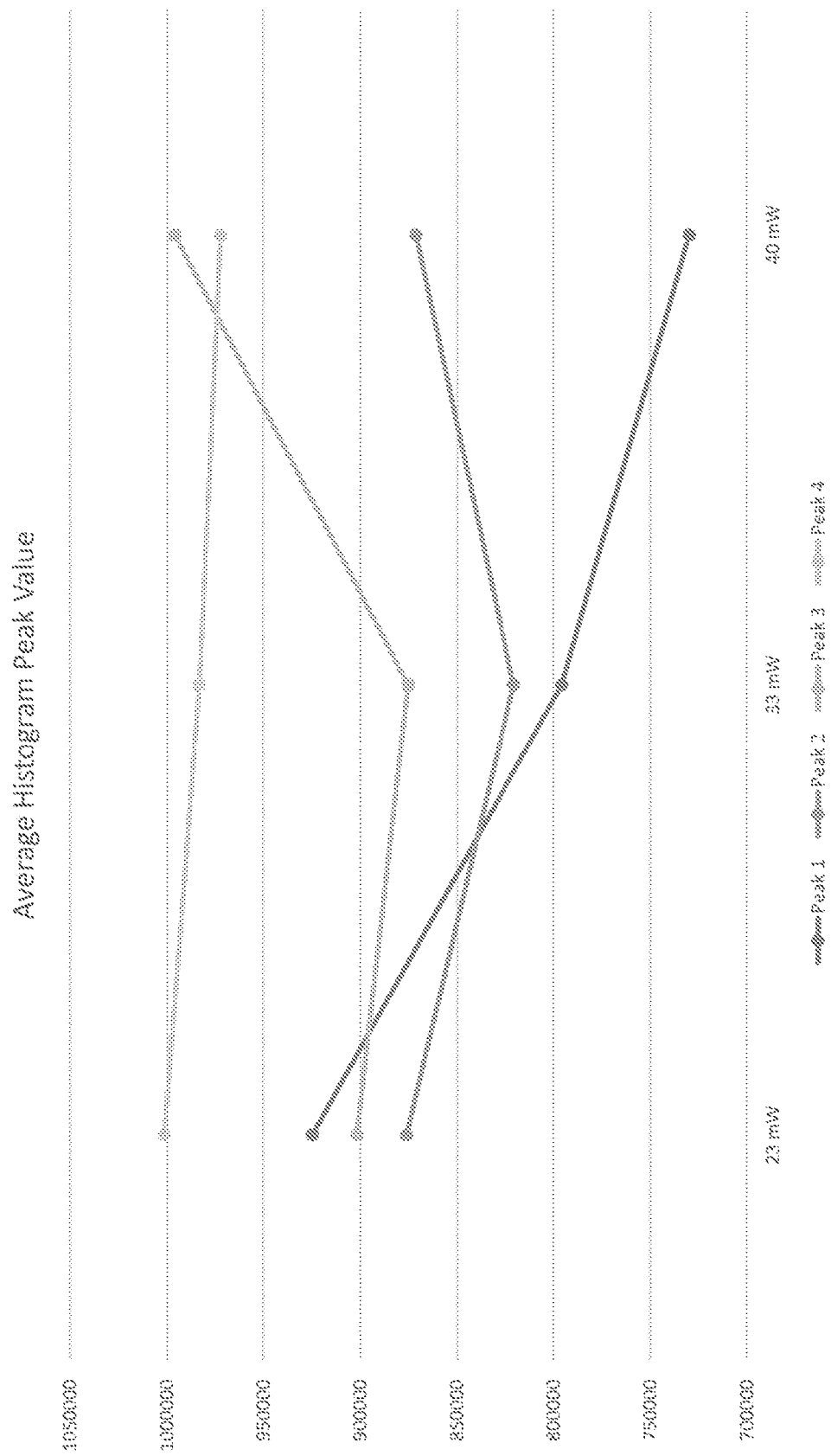
FIG. 7 is a plot illustrating average peak value associated with histograms illustrated in FIGS. 6A-6C.

Histograms are useful, but they may be difficult to transmit. To make use of histograms, additional calculations are performed to obtain "histogram contour" data that can be inserted into the back-channel data and used by the transmitter (e.g., far end optical transceiver). First, average values near each peak are calculated. FIG. 7 is a plot illustrating average peak value associated with histograms illustrated in FIGS. 6A-6C. Next, a second order fit is calculated with the Equation 1 below:

$$y = c_0 + c_1 \cdot x + c_2 \cdot x^2 \qquad \text{Equation 1:}$$

where: x=level number (0, 1, 2, 3, . . . ); and
y=average value near peak_x.

Figure 8:
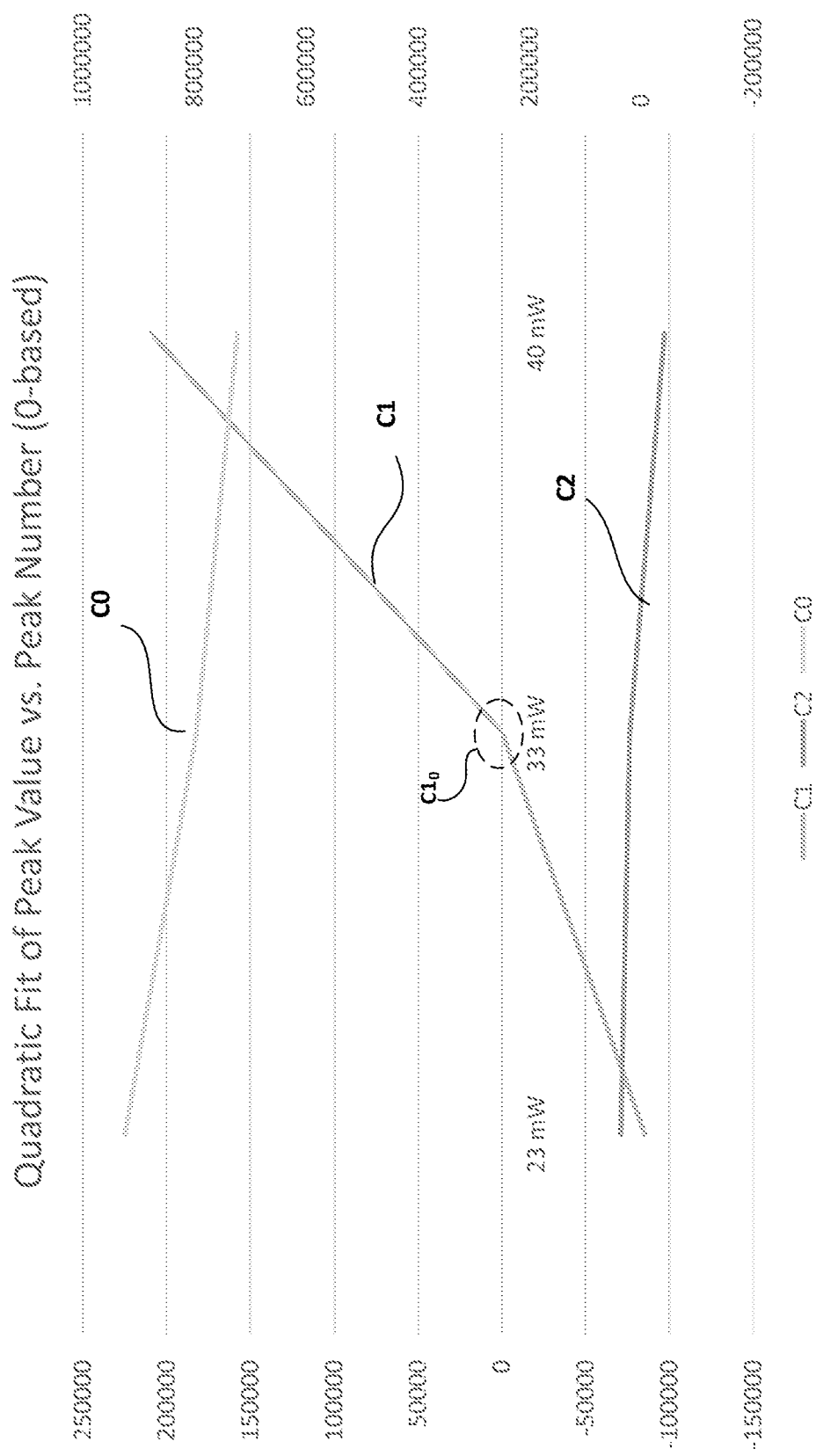
FIG. 8 is plot illustrating a quadratic fit of peak value vs. peak number, which is associated with the histograms illustrated in FIGS. 6A-6C.
Figure 9:
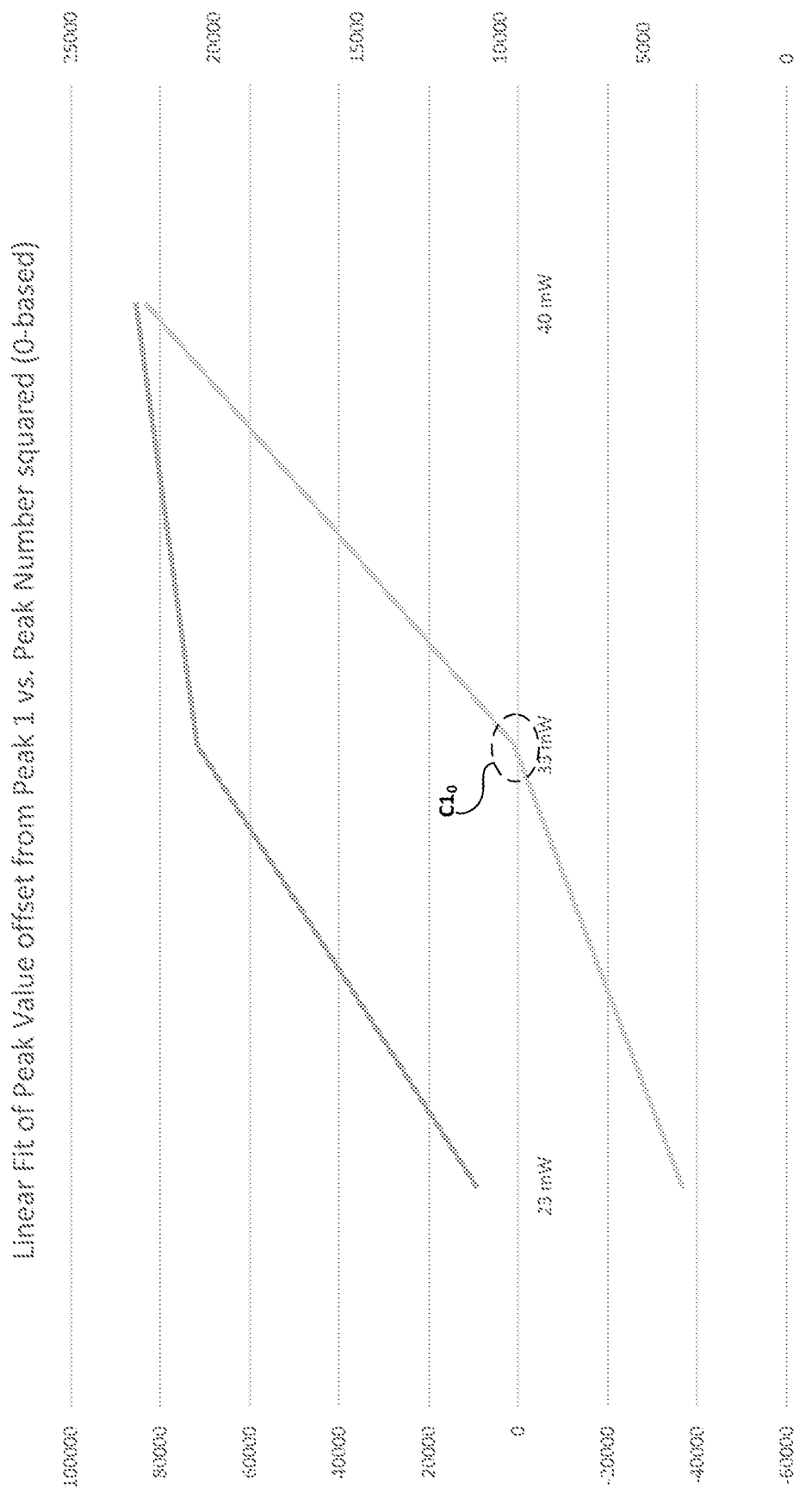
FIG. 9 is a plot illustrating linear fit of peak value offset against peak number squared.

FIG. 8 is plot illustrating a quadratic fit of peak value versus peak number, which is associated with the histograms illustrated in FIGS. 6A-6C. For example, the quadratic fit of peak values is based on Equation 1 above. The three lines in FIG. 8 are associated with coefficients $c_0$, $c_1$, and $c_1$. In various embodiments, the first order coefficient $c_1$ of a quadratic fit over the level number is used. In certain implementations, the zeroth order coefficient c0 of a linear fit over the square of the level number is used. It is to be understood that the coefficient that is to be transmitted may depend on the specific implementation. It is to be noted that with histogram-based calibration, one or more parameters associated with the quadratic fit of coefficients, $c_1$ is most relevant in obtaining the optimal data transmission parameters. In FIG. 8, there are three fit lines respectively for coefficients $c_0$, $c_1$, and $c_2$, and the optimal setting for data transmission is based on the point "$c1_0$". As an example, the line "C1" is below 0 at 23 mW setting and above 0 at 40 mW setting. At 33 mW setting (e.g., heating power that affects temperature and MZ phase), the line "C1" is at or very close to 0 at point $C1_0$. As an example, FIG. 8 shows that it is at the 33 mW MZ bias setting, SNRs for PAM4 levels are optimized and the data transmission BER is minimized. It is to be appreciated that the 33 mW MZ bias setting, as determined using $c_1$ coefficient of the quadratic equation, is very close to the 33.5 mW bias setting determined in FIG. 5. Therefore, for the purpose of determining or interpolating the histogram to obtain histogram contour information, the first order coefficient $c_1$ of the second order fit can be used. For example, $c_1$ value is used as the "histogram" contour parameter, where the quadratic equation is used. FIG. 9 is a plot illustrating linear fit of peak value offset against peak number squared. As can be seen in FIG. 9, $c_1$ value crosses zero at about 33 mW setting.

The use of $c_1$ coefficient of quadratic fit is explained below. FIG. 10 is a simplified diagram illustrating signal strength relative to signal noise. In FIG. 10, $P_k$ is the optical power level of the received symbol "k"; $N_k$ is the noise power associated with the received symbol "k"; $T_k$ is the decision threshold between the two adjacent power levels of PAM power levels. For example, $T_{k+1}$ is adjacent to $T_k$, and $T_k$ is adjacent to $T_{k-1}$. For the purpose of illustration, assume decision thresholds $T_k$ are positioned halfway between received optical power levels. For example, $T_{k-1}$ is positioned between $P_{k+1}+N_{k+1}$ and $P_k+N_k$. In an exemplary optical data communication system, the noise power is proportional to the received optical power level, which can be expressed by Equation 2 below:

$$\sigma N_k^2 = c_0 P_k \qquad \text{Equation 2:}$$

The probably of error associated with symbol k (assuming Gaussian noise) can be expressed using Equation 3 below:

$$P_{Esymbol k} = 0.5 \, \text{erfc}\left(\frac{P_k - P_{k-1}}{2(\sigma_k + \sigma_{k-1})}\right) + 1 - 0.5 \, \text{erfc}\left(\frac{P_k - P_{k+1}}{2(\sigma_k + \sigma_{k+1})}\right) \qquad \text{Equation 3}$$

where Erfc is the complementary error function (sometimes referred to Gauss error function).

The total probability of error over M equiprobable symbols can then be expressed using Equation 4 below:

$$P_{E_{total}} = \frac{1}{M} \sum_{k=0}^{M-1} P_{E_{symbol\ k}} \qquad \text{Equation 4}$$

The total probability is minimized when the individual conditional probabilities PE for each symbol are equal. This implies that the conditional probabilities of error should not depend on the index k, or $$\frac{P_{k+1} - P_k}{\sigma_k + \sigma_{k+1}}$$

should be independent of k. To equalize conditional probabilities, optical power levels can be quadratically spaced according to Equation 5 below:

$$P_k = c_1 k^2 \qquad \text{Equation 5}$$
$$\sigma_{Nk}^2 = c_o P_k$$
$$\sigma_k = \sqrt{c_o P_k} = \sqrt{c_o c_1}\, k$$
$$\sigma_{k+1} = \sqrt{c_o c_1}\, (k+1)$$
$$\frac{P_{k+1} - P_k}{\sigma_{k+1} + \sigma_k} = \frac{c_1((k+1)^2 - k^2)}{\sqrt{c_o c_1}\,((k+1)+k)}$$
$$= \frac{c_1(2k+1)}{\sqrt{c_o c_1}\,(2k+1)}$$
$$= \sqrt{\frac{c_1}{c_0}}$$

As an example, for PAM4 communication with four levels, if levels are quadratically spaced, the level would be proportional [0, 1, 4, 9], and hence the spacing between the power levels is [1, 3, 5]. Normalized to "1", the power level spacing would be [1/9, 3/9, 5/9], or about [0.11, 0.33, 0.56]. It is to be appreciated that spacing arrangement among PAM4 levels calculated here is consistent with the exemplary parameter optimization described above.

It is to be appreciated that the use of first order coefficient for optimizing data transmission, the actual optimization process are accomplished by using histograms and histogram contour parameters (e.g., quadratic fit) by the DSP function of transceivers. Depending on the actual data transmission system, other implementations are possible as well.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An optical transceiver apparatus comprising:
   an optical receiver for converting incoming optical signals to incoming electrical signals;
   a histogram generation module configured to analyze the incoming electrical signals and to generate a histogram characterizing the incoming electrical signals;
   a control module configured to process the incoming electrical signal and to generate a signal quality value based on the histogram, the signal quality value being calculated using a quadratic fit of the histogram, the signal quality value being associated with a first order coefficient of the quadratic fit;
   a back-channel insertion module configured to insert the signal quality value to an outgoing data stream; and
   an optical transmitter for generating output optical signals based on the outgoing data stream.

2. The apparatus of claim 1 wherein further comprising an FEC module configured to encapsulate the back-channel data and a portion of the outgoing data stream into an FEC frame.

3. The apparatus of claim 1 wherein the optical transmitter comprises a laser device.

4. The apparatus of claim 3 wherein the control module is configured to change one or more settings for the laser device based on received back-channel data embedded in the incoming electrical signals.

5. The apparatus of claim 4 wherein the one or more settings include a laser wavelength.

6. The apparatus of claim 1 wherein the optical transmitter comprises a modulator.

7. The apparatus of claim 6 wherein the control module is configured to change one or more settings for the modulator based on received back-channel data embedded in the incoming electrical signals.

8. The apparatus of claim 7 wherein the control module is configured to change base phase offset for the modulator, heating power being associated with a bias phase offset.

9. The apparatus of claim 1 wherein the control module is configured to adjust one or more settings of the optical transceiver until the first order coefficient reaches zero.

10. The apparatus of claim 1 wherein the histogram is based on signal levels and hit counts of the incoming electrical signals.

11. The apparatus of claim 1 wherein the signal quality value comprises a histogram contour parameter.

12. A method for optimizing optical communication, the method comprising:
    receiving a first data stream from a first optical transceiver by a second optical transceiver;
    detecting a first back-channel data segment at the first data stream by the second optical transceiver;
    determining a histogram contour parameter associated with the first data stream by the second optical transceiver, the histogram contour parameter being based on a first order coefficient of a quadratic fit;
    generating a second back-channel data by the second optical transceiver, the second back-channel data comprising the first order coefficient;
    inserting the second back-channel data to a second data stream by the second optical transceiver;
    transmitting the second data stream from the second optical transceiver to the first optical transceiver; and
    adjusting one or more operating parameters by the first optical transceiver based on the second back-channel data.

13. The method of claim 12 wherein a first set of adjustments comprises a DAC controlled heating power.

14. The method of claim 12 wherein the first data stream is in PAM4 format.

15. The method of claim 14 wherein the histogram contour parameter is based on a PAM4 histogram of the first data stream.

16. The method of claim 12 wherein further comprising adjust the one or more operating parameters by the first optical transceiver until the first order coefficient is zero.

* * * * *